(12) United States Patent
Ogahara et al.

(10) Patent No.: US 9,545,821 B2
(45) Date of Patent: Jan. 17, 2017

(54) POWER TRANSMISSION DEVICE

(71) Applicant: Komatsu Ltd., Tokyo (JP)

(72) Inventors: Hironobu Ogahara, Shimotsuke (JP); Gou Tanaka, Yuuki (JP)

(73) Assignee: Komatsu Ltd., Tokyo (JP)

( * ) Notice: Subject to any disclaimer, the term of this patent is extended or adjusted under 35 U.S.C. 154(b) by 190 days.

(21) Appl. No.: 14/390,213

(22) PCT Filed: Jul. 24, 2013

(86) PCT No.: PCT/JP2013/070116
§ 371 (c)(1),
(2) Date: Oct. 2, 2014

(87) PCT Pub. No.: WO2015/011811
PCT Pub. Date: Jan. 29, 2015

(65) Prior Publication Data
US 2015/0298502 A1   Oct. 22, 2015

(51) Int. Cl.
*B60B 27/00* (2006.01)
*B60T 5/00* (2006.01)
(Continued)

(52) U.S. Cl.
CPC ....... *B60B 27/0052* (2013.01); *B60B 27/0015* (2013.01); *B60K 17/046* (2013.01);
(Continued)

(58) Field of Classification Search
CPC ............ B60B 27/0052; B60B 27/0015; B60K 17/046; B60T 5/00; F16D 55/24; F16D 55/40; F16D 65/853; F16H 57/0486
See application file for complete search history.

(56) References Cited

U.S. PATENT DOCUMENTS

| 4,317,498 A * | 3/1982 | Jirousek | B60K 17/046 180/370 |
| 4,325,471 A * | 4/1982 | Schuster | F16D 25/126 188/72.3 |
| 6,508,336 B1 * | 1/2003 | El-Kassouf | F16D 55/40 188/71.2 |

FOREIGN PATENT DOCUMENTS

| CN | 202368550 U | 8/2012 |
| CN | 202863419 U | 4/2013 |

(Continued)

OTHER PUBLICATIONS

Supplementary European Search Report mailed Dec. 3, 2015, issued for the European patent application No. 13 87 9670.1.
(Continued)

*Primary Examiner* — Vishal Sahni
(74) *Attorney, Agent, or Firm* — Locke Lord LLP

(57) ABSTRACT

A power transmission device includes: a spindle case that includes a central hole through which an axle shaft penetrates in a central portion and forms a brake chamber in a region around the axle shaft at a base end portion; a wheel hub that is rotatably supported by an outer circumference of the spindle case and includes a final chamber, between the final chamber and the brake chamber, oil can flow, by communicating with the brake chamber through the central hole of the spindle case; a wet type brake mechanism that is contained in the brake chamber and operates so as to apply braking on rotation of the axle shaft with respect to the spindle case; and a deceleration mechanism that is contained in the final chamber and decelerates the rotation of the axle shaft to transmit the rotation to the wheel hub.

10 Claims, 7 Drawing Sheets

(51) Int. Cl.
      *F16D 55/40*       (2006.01)
      *F16D 65/853*     (2006.01)
      *F16D 55/24*       (2006.01)
      *B60K 17/04*      (2006.01)
      *F16H 57/04*       (2010.01)

(52) U.S. Cl.
      CPC ................ *B60T 5/00* (2013.01); *F16D 55/24* (2013.01); *F16D 55/40* (2013.01); *F16D 65/853* (2013.01); *F16H 57/0486* (2013.01); *B60B 2900/114* (2013.01); *B60B 2900/513* (2013.01); *F16H 57/0424* (2013.01); *F16H 57/0445* (2013.01)

(56) References Cited

FOREIGN PATENT DOCUMENTS

| | | |
|---|---|---|
| CN | 202935089 U | 5/2013 |
| JP | 62-62034 U | 4/1987 |
| JP | 2006-298092 A | 11/2006 |
| JP | 2009-281491 A | 12/2009 |
| JP | 2010-137781 A | 6/2010 |

OTHER PUBLICATIONS

International Search Report and Written Opinion mailed Sep. 24, 2013, issued for PCT/JP2013/070116.

\* cited by examiner

POWER TRANSMISSION DEVICE

FIELD

The present invention relates to a power transmission device applied to a traveling system of an industrial vehicle such as a wheel loader.

BACKGROUND

Some power transmission devices applied to a traveling system of an industrial vehicle such as a wheel loader decelerate rotation of an axle shaft by a deceleration mechanism and then transmit the rotation to a wheel hub. This kind of power transmission device is provided with a wet type multiple-disc brake mechanism between a spindle case and a wheel hub provided around the axle shaft and power transmission devices configured to apply braking on the wheel hub by actuation of the brake mechanism are provided (for example, see Patent Literature 1).

However, the power transmission device of Patent Literature 1 has a configuration in which the brake mechanism is provided around the outer circumference of the wheel hub, so that there is a problem that it is difficult to reduce the size of the brake mechanism. Therefore, conventionally, power transmission devices in which the brake mechanism is provided between the axle shaft and the spindle case are provided. According to this power transmission device, the brake mechanism may be provided around the outer circumference of the axle shaft, so that it is possible to reduce the size of the brake mechanism (for example, see Patent Literature 2).

CITATION LIST

Patent Literature

Patent Literature 1: Japanese Patent Application Laid-open No. 2006-298092
Patent Literature 2: Japanese Patent Application Laid-open No. 2010-137781

SUMMARY

Technical Problem

By the way, as in Patent Literature 1, in the power transmission device in which the brake mechanism is provided between the spindle case and the wheel hub, the rotation of the wheel hub, which is to be braked by the brake mechanism, has been decelerated by the deceleration mechanism, so that there is an advantage that the amount of heat generation during braking is relatively small. Furthermore, in the power transmission device of Patent Literature 1, friction plates and mating plates included in the brake mechanism are formed to have a large diameter, so that the heat generated during braking is easily dissipated to the outside.

On the other hand, as in Patent Literature 2, in the power transmission device in which the brake mechanism is provided between the axle shaft and the spindle case, the rotation of the axle shaft, which is to be braked by the brake mechanism, has not been decelerated by the deceleration mechanism, so that the amount of heat generation during braking is larger than that of the power transmission device described in Patent Literature 1 even when the speed of rotation of the wheel hub is the same.

In view of the above situation, an object of the present invention is to provide a power transmission device, the size of which can be reduced without impairing a cooling effect of the brake mechanism.

Solution to Problem

To achieve the above-described object, a power transmission device according to the present invention includes: a spindle case that includes a central hole through which an axle shaft penetrates in a central portion and forms a brake chamber in a region around the axle shaft at a base end portion; a wheel hub that is rotatably supported by an outer circumference of the spindle case and includes a final chamber, between the final chamber and the brake chamber, oil can flow, by communicating with the brake chamber through the central hole of the spindle case; a wet type brake mechanism that is contained in the brake chamber and operates so as to apply braking on rotation of the axle shaft with respect to the spindle case; and a deceleration mechanism that is contained in the final chamber and decelerates the rotation of the axle shaft to transmit the rotation to the wheel hub, wherein a through hole that causes the brake chamber to communicate with the final chamber of the wheel hub is provided in the spindle case and the oil in the brake chamber is supplied inside the final chamber through the through hole when the axle shaft rotates.

Moreover, in the above-described power transmission device according to the present invention, an oil reservoir is provided on an inner circumferential surface of the spindle case located on an outer circumference of the brake chamber.

Moreover, in the above-described power transmission device according to the present invention, the brake mechanism includes a plurality of rotation side plates which are arranged in a direction perpendicular to the axle shaft and rotate along with the axle shaft, a plurality of stop side plates supported by the spindle case in a form in which the stop side plates and the rotation side plates are alternately arranged, and a brake drive unit that urges the rotation side plates and the stop side plates in a direction approaching the deceleration mechanism along the axle shaft, and applies braking on the axle shaft by pressing the rotation side plates and the stop side plates to a flange wall portion of the spindle case by the brake drive unit, the through hole is provided in the flange wall portion of the spindle case, and a supply oil passage is provided in a portion from the oil reservoir of the spindle case to the through hole.

Moreover, in the above-described power transmission device according to the present invention, a supply oil passage is provided in a portion from the oil reservoir of the spindle case to the through hole along a radial direction of the axle shaft.

Moreover, in the above-described power transmission device according to the present invention, the brake mechanism includes an end plate between the brake mechanism and the flange wall portion of the spindle case, and the supply oil passage is formed by forming a concave groove in the end plate.

Moreover, in the above-described power transmission device according to the present invention, the supply oil passage is formed by forming a concave groove in the flange wall portion of the spindle case.

Moreover, in the above-described power transmission device according to the present invention, the concave groove in the flange wall portion, which forms the supply oil passage, is formed only in a portion from the oil reservoir of the spindle case to the through hole.

Advantageous Effects of Invention

According to the present invention, the brake mechanism is configured to put brakes on rotation of the axle shaft with respect to the spindle case, so that it is possible to reduce the size of the brake mechanism. Furthermore, a final chamber that contains the deceleration mechanism and a brake chamber that contains the brake mechanism are provided in positions separated from each other, and further, oil can circulate between the final chamber and the brake chamber through a central hole and a through hole of the spindle case, so that it is possible to prevent heat from affecting the brake mechanism.

DESCRIPTION OF EMBODIMENTS

Hereinafter, preferred embodiments of a power transmission device according to the present invention will be described in detail with reference to the accompanying drawings.

First Embodiment

Figure 1:
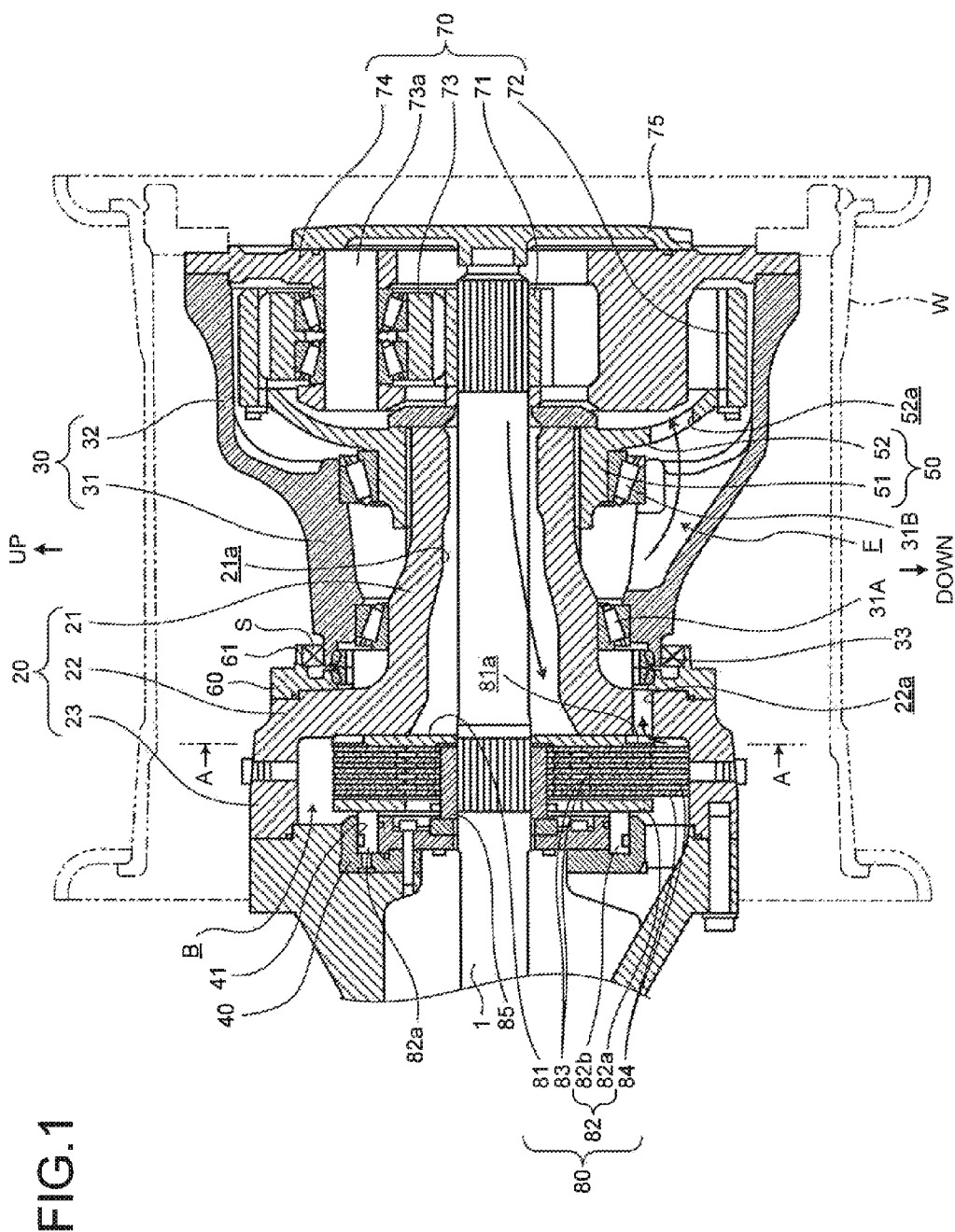
FIG. 1 is a cross-sectional side view illustrating a main part of a power transmission device which is a first embodiment of the present invention.
Figure 3:
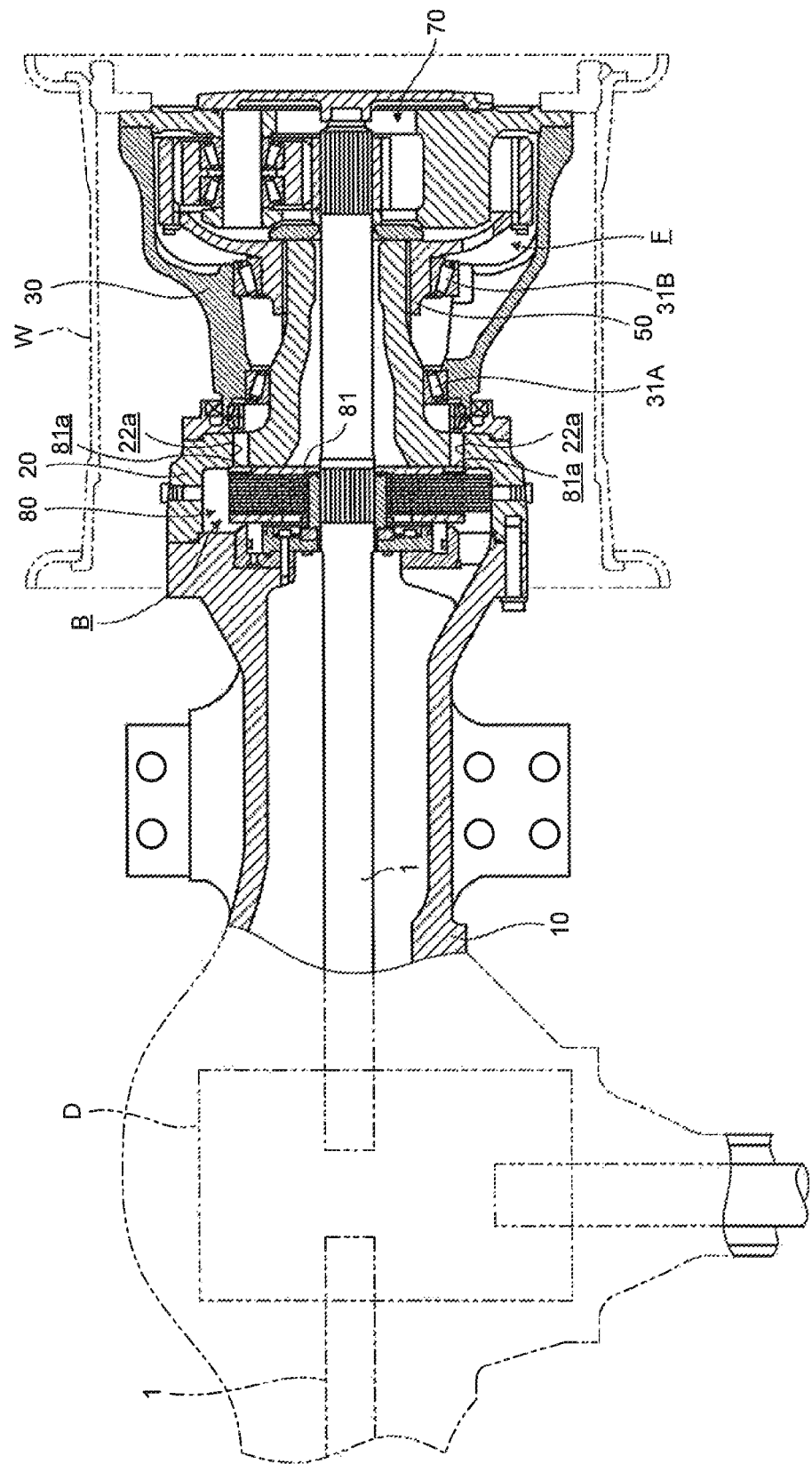
FIG. 3 is a plan partially cutaway view of the power transmission device illustrated in FIG. 1.

FIG. 1 illustrates a main part of a power transmission device which is a first embodiment of the present invention. The power transmission device illustrated here is applied as an axle device for transmitting power from a differential gear mechanism D to a wheel W through an axle shaft 1 as illustrated in FIG. 3 in an industrial vehicle such as a wheel loader. Although not explicitly illustrated in the drawings, in the power transmission device exemplified in the first example, the structure from the differential gear mechanism D to the wheel W is left-right symmetric, so that either one of the left and right portions will be described below.

Configuration of Power Transmission Device

As illustrated in FIGS. 1 and 3, the power transmission device of the first embodiment includes a spindle case 20 and a wheel hub 30 at a tip portion of an axle case 10 that contains the axle shaft 1.

Configuration of Spindle Case 20

The spindle case 20 is formed by integrally molding a case base portion 21, a flange wall portion 22, and a brake cover portion 23 and is attached to the tip portion of the axle case 10 through a base end surface of the brake cover portion 23. The case base portion 21 has a cylindrical shape with a relatively small diameter and includes a central hole 21a through which the axle shaft 1 penetrates at its center. The flange wall portion 22 is formed in a disk shape protruding from a base end portion of the case base portion 21 toward the outer circumference. The brake cover portion 23 is provided to form a cylindrical shape with a diameter larger than that of the central hole 21a of the case base portion 21 from the outer circumferential end of the flange wall portion 22. The brake cover portion 23 forms a brake chamber B between the brake cover portion 23 and a brake cylinder 40 provided at the tip portion of the axle case 10.

A gear support body 50 is provided at the tip portion of the case base portion 21 of the spindle case 20. The gear support body 50 is formed by integrally molding a support base portion 51 having a cylindrical shape with a diameter larger than that of the case base portion 21 and a support plate portion 52 protruding from the tip portion of the support base portion 51 toward the outer circumference. The gear support body 50 is spline-connected to the tip portion of the case base portion 21 through the support base portion 51 in a state in which the support plate portion 52 faces the tip side of the axle shaft 1, so that relative rotation of the gear support body 50 with respect to the case base portion 21 is restricted. As obvious from the drawings, the outer circumferential end of the support plate portion 52 has a curved shape facing the tip side of the axle shaft 1. As illustrated in FIG. 1, in the support plate portion 52, continuous holes 52a are provided at regular intervals in the circumferential direction.

A seal retainer 60 is provided at the outer circumferential portion of the flange wall portion 22 of the spindle case 20. The seal retainer 60 is a ring-shaped member configured to have a diameter larger than that of the base end portion of the case base portion 21 and is attached to a surface of the flange wall portion 22 positioned on the tip side of the flange wall portion 22. The seal retainer 60 is provided with a seal receiving portion 61. The seal receiving portion 61 is a thin ring-shaped portion protruding from the tip surface of the seal retainer 60.

Configuration of Wheel Hub 30

The wheel hub 30 is formed by integrally molding a rotation support portion 31 and a final cover portion 32. The rotation support portion 31 has a cylindrical shape with a diameter larger than that of the support base portion 51 of the gear support body 50 and is rotatably supported around the axis of the axle shaft 1 with respect to the spindle case 20 and the gear support body 50 by placing a bearing 31A between the rotation support portion 31 and the case base portion 21 of the spindle case 20 and a bearing 315 between the rotation support portion 31 and the support base portion 51 of the gear support body 50.

A seal support portion 33 is integrally provided at the base end portion of the rotation support portion 31. The seal support portion 33 is a thin ring-shaped portion with a diameter smaller than the inside diameter of the seal receiving portion 61 provided to the seal retainer 60 and is provided so that its outer circumferential surface faces the inner circumferential surface of the seal receiving portion 61. A dust seal S is placed between the outer circumferential surface of the seal support portion 33 and the inner circumferential surface of the seal receiving portion 61.

The final cover portion 32 is configured to protrude from the rotation support portion 31 toward the outer circumference and then cylindrically protrude toward the tip side so that the cylindrically protruding portion covers the outer circumference of the tip portion of the axle shaft 1.

Configuration of Deceleration Mechanism 70

In the final cover portion 32 of the wheel hub 30, a deceleration mechanism 70 is formed between the gear support body 50 provided to the spindle case 20 and the axle shaft 1. The deceleration mechanism 70 is a planetary gear mechanism including a sun gear 71 spline-connected to the axle shaft 1, a ring gear 72 having internal teeth supported by the final cover portion 32, and a plurality of planetary gears 73 provided to mesh with the sun gear 71 and the ring gear 72 respectively. A planetary carrier 74 that supports a rotating shaft 73a of the plurality of planetary gears 73 is fixed to the final cover portion 32 through the outer circumferential portion thereof. The planetary carrier 74 along with a cover plate 75 attached to the center thereof closes the opening of the final cover portion 32 and the planetary carrier 74 along with the final cover portion 32 of the wheel hub 30 and the seal retainer 60 forms a final chamber F at the outer circumferential portion and the tip portion of the spindle case 20.

In the deceleration mechanism 70, the ring gear 72 is fixed to the axle case 10 through the gear support body 50 and the spindle case 20, so that when the sun gear 71 is rotated by the axle shaft 1, the planetary gears 73 revolve around the sun gear 71 while autorotating. Therefore, the wheel hub 30 is rotated in a decelerated state through the planetary carrier 74.

Configuration of Brake Mechanism 80

On the other hand, in the brake chamber B formed at the brake cover portion 23, a wet type multiple-disc brake mechanism 80 is formed. The brake mechanism 80 is formed by alternately laminating a plurality of friction plates (rotation side plates) 83 and a plurality of mating plates (stop side plates) 84 between an end plate 81 and a disk portion (brake drive unit) 82a of a brake piston 82.

Figure 2:
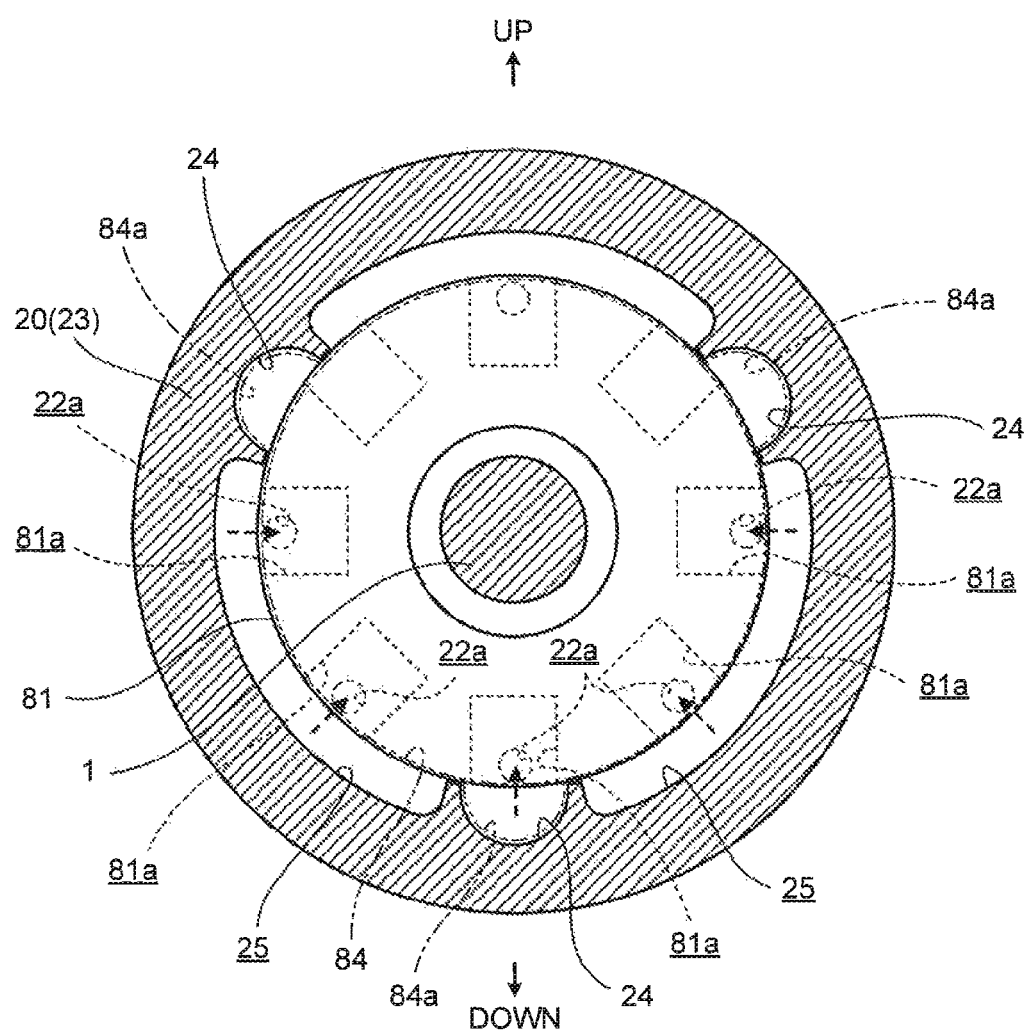
FIG. 2 is a cross-sectional view taken along line A-A in FIG. 1.

The end plate 81 is a disk-shaped member rotatably arranged with respect to the axle shaft 1 as illustrated in FIG. 2 and is provided at the frontmost position in the brake chamber B to face the inner wall surface of the flange wall, portion 22 as illustrated in FIG. 1.

The disk portion 82a of the brake piston 82 is a disk-shaped member provided at a position closest to the base end in the brake chamber B and is supported by the brake cylinder 40 through a plurality of rod portions 82b protruding along the axis direction of the axle shaft 1. The rod portion 82b is slidably inserted into a pressure chamber 41 formed in the brake cylinder 40 and has a function to guide movement of the disk portion 82a along the axis direction of the axle shaft 1. Although not explicitly illustrated in the drawings, a return spring for urging the disk portion 82a in a direction coming close to the brake cylinder 40 at all times is placed between the disk portion 82a of the brake piston 82 and the brake cylinder 40. An oil supply passage for supplying oil is connected to the pressure chamber 41 of the brake cylinder 40.

The friction plates 83 and the mating plates 84 are disk-shaped members arranged around the outer circumference of an engagement collar 85 that is spline-connected to the outer circumferential surface of the axle shaft 1. These friction plates 83 and the mating plates 84 are arranged between the axle shaft 1 and the brake cover portion 23 of the spindle case 20 so that the friction plates 83 and the mating plates 84 relatively rotate when the axle shaft 1 rotates. More specifically, the friction plates 83 are arranged so that the inner circumferential surfaces thereof engage with the engagement collar 85 and the outer circumferential surfaces thereof can rotate with respect to the brake cover portion 23. As illustrated in FIG. 2, the mating plate 84 has semicircular-shaped protruding portions 84a at three positions on the outer circumferential surface and engages with the brake cover portion 23 by positioning these protruding portions 84a at reception concave portions 24 formed in the inner circumferential surface of the brake cover portion 23.

In the brake mechanism 80, when the axle shaft 1 rotates, the friction plates 83 rotate with respect to the mating plates 84 through the engagement collar 85. When no pressure is applied to the pressure chamber 41 of the brake cylinder 40, the disk portion 82a of the brake piston 82 is maintained at a position close to the brake cylinder 40 by an elastic force of the return spring not illustrated in the drawings, so that no pressure force is applied between the friction plates 83 and the mating plates 84. On the other hand, when oil is supplied to the pressure chamber 41 of the brake cylinder 40, the disk portion 82a is moved in a direction coming close to the end plate 81 by the pressure of the oil through the rod portions 82b, so that the disk portion 82a presses the friction plates 83 and the mating plates 84 to the end plate 81. As a result, braking is applied to the rotation of the axle shaft 1 with respect to the axle case 10 by a frictional force applied between the friction plates 83 and the mating plates 84. The lower half of the friction plates 83 and the mating plates 84, which generate frictional heat during braking, is immersed in the oil accumulated in the brake chamber B, so that the friction plates 83 and the mating plates 84 are cooled by the oil.

Features of Power Transmission Device

In the power transmission device described above, the brake mechanism 80 is provided around the circumference of the axle shaft 1, so that it is possible to reduce the size of the brake mechanism 80.

Here, the axle shaft 1, which is to be braked by the brake mechanism 80, rotates in a state in which the axle shaft 1 has not been decelerated by the deceleration mechanism 70, so that the amount of heat generation during braking is relatively large. Further, the friction plates 83 and the mating plates 84 have a small diameter, so that there is a disadvantage with respect to heat dissipation. The brake chamber B that contains the brake mechanism 80 and the final chamber F that contains the deceleration mechanism 70 are communicated with each other by the central hole 21a of the spindle case 20, so that the oil flows between the chambers. However the amount of the flow is not sufficient and there is a risk that the brake chamber B remains in a high-temperature state due to the heat generated by the brake mechanism 80.

Therefore, in the power transmission device, as illustrated in FIGS. 1 and 3, a through hole 22a is formed at a position communicating with the final chamber F in the flange wall portion 22 of the spindle case 20 and an oil reservoir 25 is formed on the outer circumference of the brake chamber B, and further, a concave groove 81a for communicating between the through hole 22a and the brake chamber B is provided in the end plate 81.

The through hole 22a is a hole provided at a plurality of positions in the flange wall portion 22, which becomes the lower half portion when mounted in an industrial vehicle. More specifically, cross-sectionally circular through holes 22a are provided at five positions in the lower half portion at equal intervals on a circle around the axis of the axle shaft 1.

The oil reservoir 25 is formed at an outer circumferential region of the end plate 81, the friction plates 83, and the mating plates 84 by providing a concave portion in the inner circumferential surface of the brake cover portion 23 located around the outer circumference of the brake mechanism 80.

The concave groove 81a of the end plate 81 is provided along the radial direction of the axle shaft 1 in a surface facing the flange wall portion 22 of the spindle case 20 and is formed so as to face each through hole 22a and open in the outer circumferential surface of the end plate 81. The concave groove 81a of the end plate 81 forms a supply oil passage from the oil reservoir 25 (and the reception concave portions 24) of the brake chamber B to the through hole 22a provided in the flange wall portion 22 between the end plate 81 and the inner wall surface of the flange wall portion 22.

Operation and Effect of Power Transmission Device

According to the power transmission device configured as described above, the oil reservoir 25 is provided at the outer circumference of the brake chamber B, so that the amount of oil accumulated inside the brake chamber B increases and it is advantageous for cooling the brake mechanism 80.

Further, the brake chamber B and the final chamber F are not only communicated with each other through the central hole 21a of the spindle case 20, but also directly communicated with each other by the through hole 22a provided in the flange wall portion 22 of the spindle case 20 and the concave groove 81a provided in the end plate 81. Therefore, the oil actively flows between the brake chamber B and the final chamber F, so that it is possible to prevent the oil in the brake chamber B from remaining in a high-temperature state.

In other words, according to the power transmission device described above, when the axle shaft 1 rotates, the oil in the brake chamber B moves to the oil reservoir 25 in the outer circumferential direction by the action of centrifugal force by the rotation of the friction plates 83. The oil pressed into the oil reservoir 25 of the brake chamber B reaches the through hole 22a in the flange wall portion 22 through the concave groove 81a provided in the end plate 81 and moves to the final chamber F through the through hole 22a. When the oil in the brake chamber B moves to the final chamber F through the concave groove 81a in the end plate 81 and the through hole 22a in flange wall portion 22, the oil accumulated in the final chamber F is pushed out to the brake chamber B through the central hole 21a of the spindle case 20, so that the oil accumulated in the final chamber F is supplied to the brake chamber B. As a result, while the axle shaft 1 is rotating, the flow of the oil described above repeatedly occurs, so that the brake mechanism 80 can be cooled at all times by relatively low-temperature oil supplied to the brake chamber B from the final chamber F through the central hole 21a of the spindle case 20. Therefore, it is possible to reduce the size of the brake mechanism 80 without impairing the cooling effect of the brake mechanism 80.

Second Embodiment

Configuration of Power Transmission Device

Figure 4:
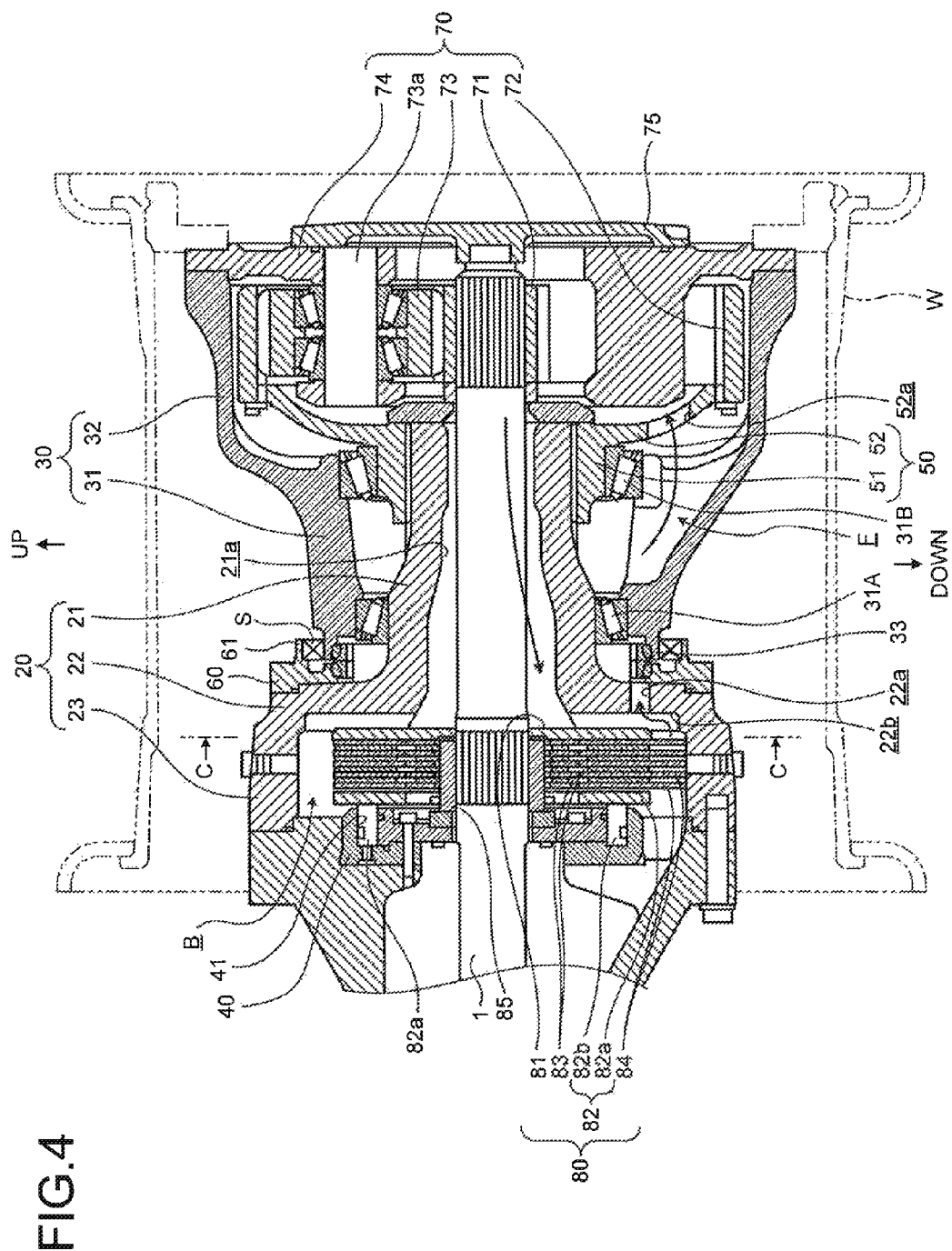
FIG. 4 is a cross-sectional side view illustrating a main part of a power transmission device which is a second embodiment of the present invention.
Figure 5:
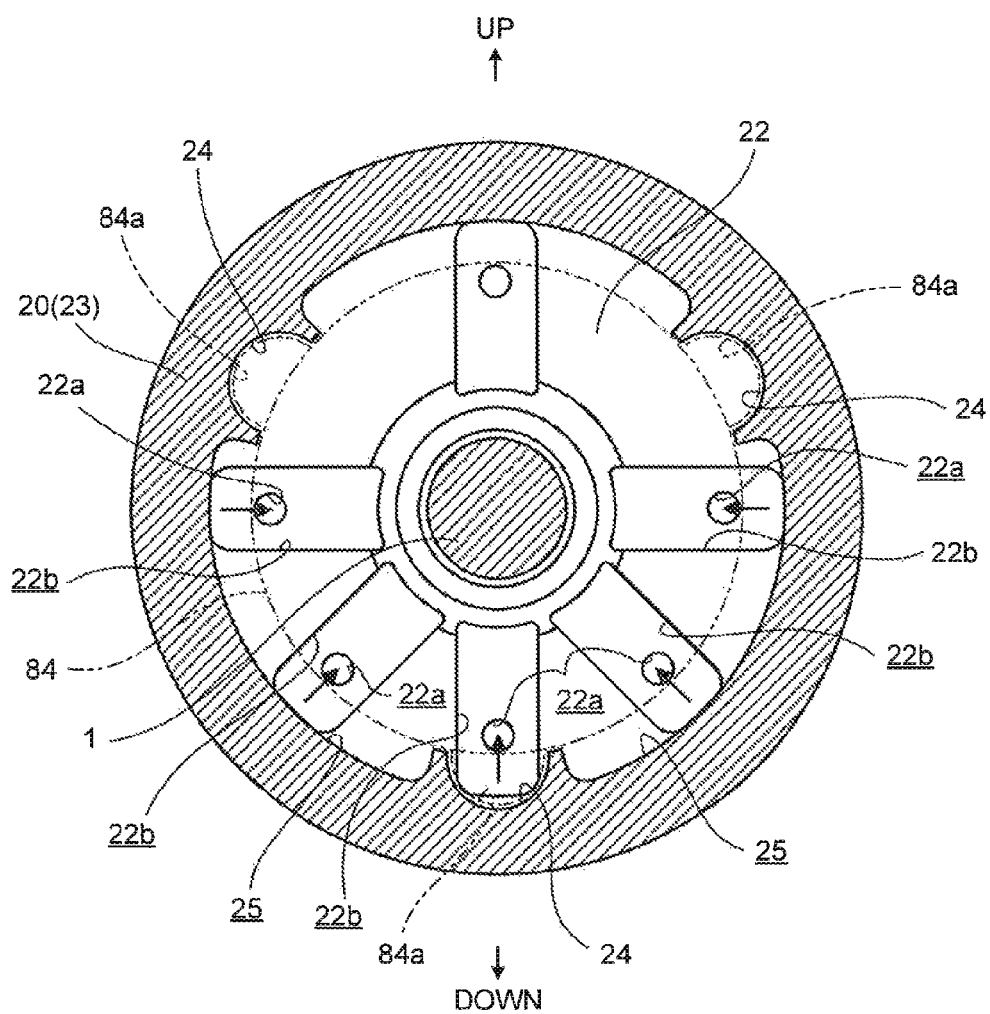
FIG. 5 is a cross-sectional view taken along line C-C in FIG. 4.

In the first embodiment described above, the supply oil passage is formed by providing the concave groove 81a in the end plate 81 which is a component of the brake mechanism 80. However, the present invention is not limited to this. For example, as in a second embodiment of a power transmission device illustrated in FIGS. 4 and 5, it is possible to form a supply oil passage from the oil reservoir 25 of the brake chamber B to the through hole 22a provided in the flange wall portion 22 between the flange wall portion 22 and the end plate 81 by forming a concave groove 22b in the inner wall surface of the flange wall portion 22 facing the end plate 81 of the brake mechanism 80. In the second embodiment illustrated in FIGS. 4 and 5, the same components as those in the first embodiment are given the same reference numerals and detailed description thereof will not be repeated.

Operation and Effect of Power Transmission Device

Also in the power transmission device of the second embodiment configured as described above, the oil reservoir 25 is provided at the outer circumference of the brake chamber B, so that the amount of oil accumulated inside the brake chamber B increases and it is advantageous for cooling the brake mechanism 80.

Further, not only the brake chamber B and the final chamber F are communicated with each other through the central hole 21a of the spindle case 20, but also the brake chamber B and the final chamber F are directly communicated with each other by the through hole 22a and the concave groove 22b provided in the flange wall portion 22 of the spindle case 20. Therefore, the oil actively flows between the brake chamber B and the final chamber F, so that it is possible to prevent the oil in the brake chamber B from remaining in a high-temperature state.

In other words, according to the power transmission device described above, when the axle shaft 1 rotates, the oil in the brake chamber B moves to the oil reservoir 25 in the outer circumferential direction by the action of centrifugal force by the rotation of the friction plates 83, reaches the through hole 22a through the concave groove 22b provided in the flange wall portion 22, and moves to the final chamber F through the through hole 22a. When the oil in the brake chamber B moves to the final chamber F through the concave groove 22b and the through hole 22a in the flange wall portion 22, the oil accumulated in the final chamber F is pushed out to the brake chamber B through the central hole 21a of the spindle case 20. As a result, while the axle shaft 1 is rotating, the flow of the oil described above repeatedly occurs, so that the brake mechanism 80 can be cooled at all times by relatively low-temperature oil supplied to the brake chamber B from the final chamber F through the central hole 21a of the spindle case 20. Therefore, it is possible to reduce the size of the brake mechanism 80 without impairing the cooling effect of the brake mechanism 80.

Third Embodiment

Configuration of Power Transmission Device

As described above, in the second embodiment, the supply oil passage is formed by forming the concave groove 22b from the oil reservoir 25 of the brake chamber B to the central hole 21a of the spindle case 20 in the inner wall surface of the flange wall portion 22. However, as in a third embodiment illustrated in FIGS. 6 and 7, in a spindle case 120, a concave groove 122b may be provided only from the oil reservoir 25 of the brake chamber B to the through hole 22a in an inner wall surface of a flange wall portion 122 facing the end plate 81 of the brake mechanism 80 and a supply oil passage may be formed between the concave groove 122b and the end plate 81.

Figure 6:
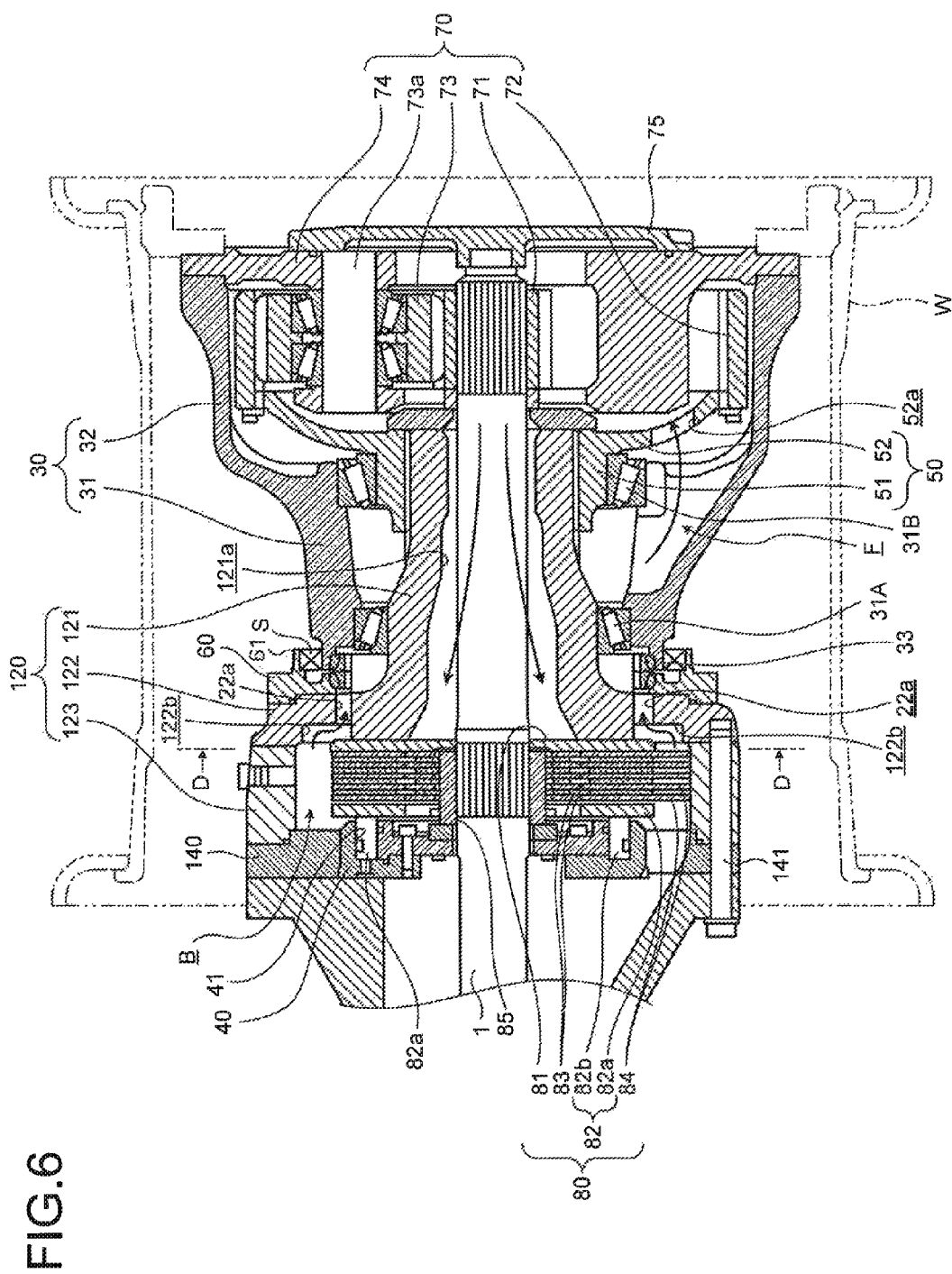
FIG. 6 is a cross-sectional plan view illustrating a main part of a power transmission device which is a third embodiment of the present invention.
Figure 7:
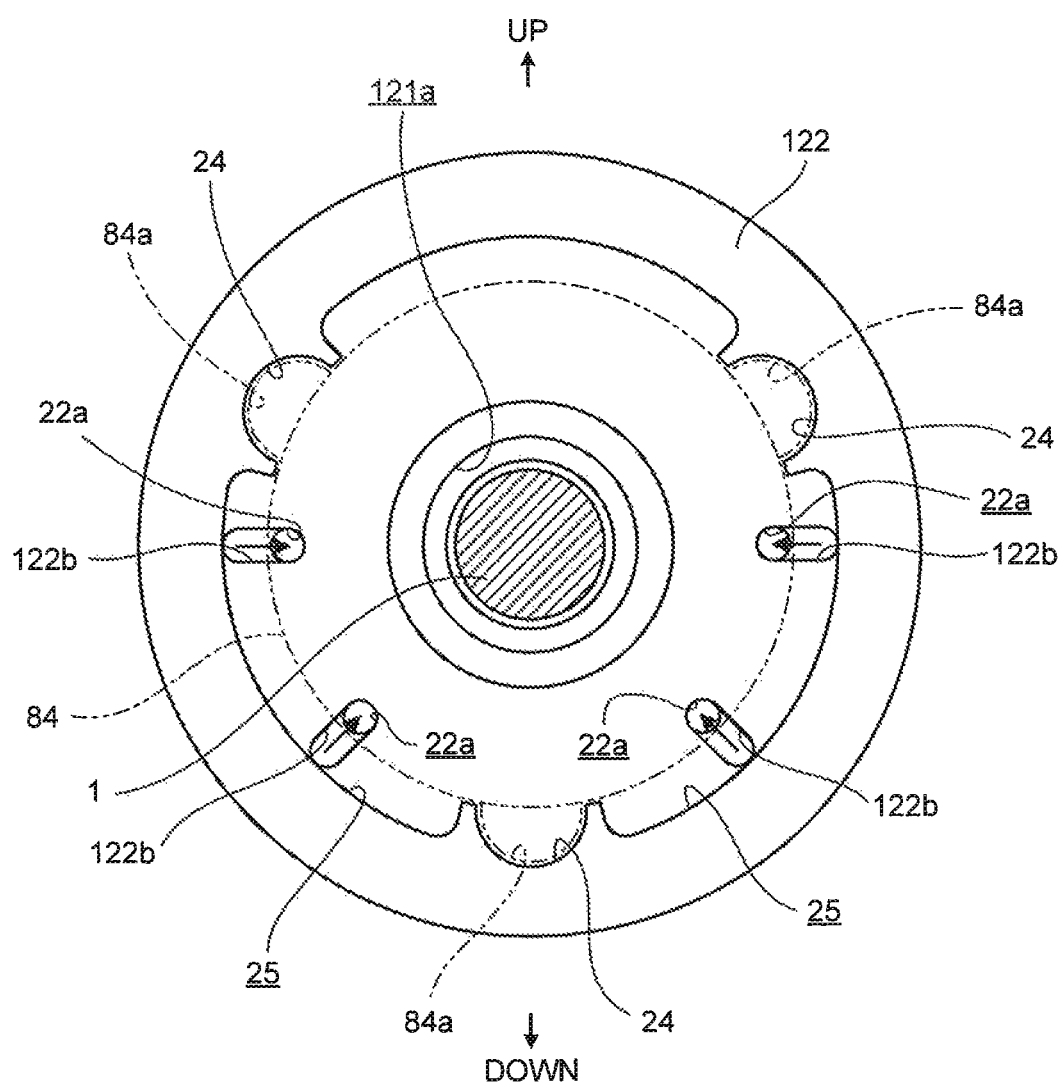
FIG. 7 is a cross-sectional view taken along line D-D in FIG. 6.

Further, as illustrated in FIG. 6, regarding the spindle case 120, only a case base portion 121 and the flange wall portion 122 are integrally formed and a brake cover portion 123 is formed as a separate body. In the same manner, a portion that supports the brake cylinder 40 is formed as a brake housing 140 separated from the axle case 10. The spindle case 120, the brake cover portion 123, the brake housing 140, and the axle case 10 are integrated together by tightening a bolt 141 between them and the same configuration as that of the first embodiment is made. In the third embodiment illustrated in FIGS. 6 and 7, the same components as those in the first embodiment are given the same reference numerals and detailed description thereof will not be repeated.

Operation and Effect of Power Transmission Device

Also in the power transmission device of the third embodiment configured as described above, the oil reservoir 25 is provided at the outer circumference of the brake chamber B, so that the amount of oil accumulated inside the brake chamber B increases and it is advantageous for cooling the brake mechanism 80.

Further, not only the brake chamber B and the final chamber F are communicated with each other through a central hole 121a of the spindle case 120, but also the brake chamber B and the final chamber F are directly communicated with each other by the through hole 22a and the concave groove 122b provided in the flange wall portion 122 of the spindle case 120. Therefore, the oil actively flows between the brake chamber B and the final chamber F, so that it is possible to prevent the oil in the brake chamber B from remaining in a high-temperature state.

In other words, according to the power transmission device described above, when the axle shaft 1 rotates, the oil in the brake chamber B moves to the oil reservoir 25 in the outer circumferential direction by the action of centrifugal force by the rotation of the friction plates 83, reaches the through hole 22a through the concave groove 122b provided in the flange wall portion 122, and moves to the final chamber F through the through hole 22a. When the oil in the brake chamber B moves to the final chamber F through the concave groove 122b and the through hole 22a in the flange wall portion 122, the oil accumulated in the final chamber F is pushed out to the brake chamber B through the central hole 121a of the spindle case 120. As a result, while the axle shaft 1 is rotating, the flow of the oil described above repeatedly occurs, so that the brake mechanism 80 can be cooled at all times by relatively low-temperature oil supplied to the brake chamber B from the final chamber F through the central hole 121a of the spindle case 120. Therefore, it is possible to reduce the size of the brake mechanism 80 without impairing the cooling effect of the brake mechanism 80.

In particular, according to the power transmission device of the third embodiment, the concave groove 122b is provided only from the oil reservoir 25 of the brake chamber B to the through hole 22a in the inner wall surface of the flange wall portion 122 facing the end plate 81 of the brake mechanism 80 and the supply oil passage is formed between the concave groove 122b and the end plate 81. Therefore, the oil in the oil reservoir 25 passes through only the through hole 22a without flowing into the central hole 121a of the spindle case 120, so that it is possible to cause the oil to efficiently flow between the brake chamber B and the final chamber F.

Modified Example of Power Transmission Device

In the first to the third embodiments described above, a power transmission device including the deceleration mechanism 70 formed by a planetary gear mechanism is exemplified. However, the deceleration mechanism 70 need not necessarily be a planetary gear mechanism, but may be another deceleration mechanism which decelerates the rotation of the axle shaft 1 and transmits the rotation to the wheel hub 30. Further, a power transmission device including the wet type multiple-disc brake mechanism 80 is exemplified. However, the power transmission device may use another brake mechanism as long as the brake mechanism is wet type. When the multiple-disc brake mechanism 80 is used, in the first to the third embodiments described above, the wet type multiple-disc brake mechanism 80 in which the friction plates 83 rotate along with the axle shaft 1 is exemplified. However, it may be configured so that the mating plates 84 rotate along with the axle shaft 1.

REFERENCE SIGNS LIST

1 Axle shaft
20, 120 Spindle case
21a, 121a Central hole
22, 122 Flange wall portion
22a Through hole
22b, 122b Concave groove
23 Brake cover portion
24 Reception concave portion
25 Oil reservoir
30 Wheel hub
70 Deceleration mechanism
80 Brake mechanism
81 End plate
81a Concave groove
82 Brake piston
83 Friction plate
84 Mating plate
B Brake chamber
F Final chamber

The invention claimed is:

1. A power transmission device comprising:
a spindle case defining a central hole through which an axle shaft penetrates in a central portion, and a brake chamber in a region around the axle shaft at a base end portion;
a wheel hub rotatably supported by an outer circumference of the spindle case and defining a final chamber, wherein the final chamber and the brake chamber are configured to allow oil to flow therebetween via communication with the central hole of the spindle case;
a wet type brake mechanism contained in the brake chamber and configured to apply braking on rotation of the axle shaft with respect to the spindle case; and
a deceleration mechanism contained in the final chamber and configured to decelerate and transmit rotation of the axle shaft to the wheel hub,
wherein through holes that allow additional fluid communication of the brake chamber and the final chamber of the wheel hub are provided in a flange wall portion of the spindle case, the through holes being openings provided at a plurality of positions, including in the flange wall portion and on an outer circumferential side of a midpoint of a radius of the brake chamber, and
wherein the oil in the brake chamber is supplied inside the final chamber through the through holes when the axle shaft rotates.

2. The power transmission device according to claim 1, wherein an oil reservoir is provided on an inner circumferential surface of the spindle case located on an outer circumference of the brake chamber.

3. The power transmission device according to claim 2, wherein
the brake mechanism includes a plurality of rotation side plates which are arranged in a direction perpendicular to the axle shaft and rotate along with the axle shaft, a plurality of stop side plates supported by the spindle case in a form in which the stop side plates and the rotation side plates are alternately arranged, and a brake drive unit that urges the rotation side plates and the stop side plates in a direction approaching the deceleration mechanism along the axle shaft, and applies braking on the axle shaft by pressing the rotation side plates and the stop side plates to the flange wall portion of the spindle case by the brake drive unit, and a supply oil passage is provided in a portion from the oil reservoir of the spindle case to the through holes.

4. The power transmission device according to claim 2, wherein a supply oil passage is provided in a portion from the oil reservoir of the spindle case to the through holes along a radial direction of the axle shaft.

5. The power transmission device according to claim 3, wherein the brake mechanism includes an end plate between the brake mechanism and the flange wall portion of the spindle case, and the supply oil passage is formed by forming a concave groove in the end plate.

6. The power transmission device according to claim 3, wherein the supply oil passage is formed by forming a concave groove in the flange wall portion of the spindle case.

7. The power transmission device according to claim 6, wherein the concave groove in the flange wall portion, which forms the supply oil passage, is formed only in a portion from the oil reservoir of the spindle case to the through holes.

8. The power transmission device according to claim 4, wherein the brake mechanism includes an end plate between the brake mechanism and the flange wall portion of the spindle case, and the supply oil passage is formed by forming a concave groove in the end plate.

9. The power transmission device according to claim 4, wherein the supply oil passage is formed by forming a concave groove in the flange wall portion of the spindle case.

10. The power transmission device according to claim 9, wherein the concave groove in the flange wall portion, which forms the supply oil passage, is formed only in a portion from the oil reservoir of the spindle case to the through holes.

* * * * *